Oct. 31, 1944.  D. GILMORE  2,361,837

AUTOMATIC LIQUID DISPENSING DEVICE

Filed March 4, 1944  2 Sheets-Sheet 1

INVENTOR.
DALE GILMORE
BY
Martin E. Anderson
attorney

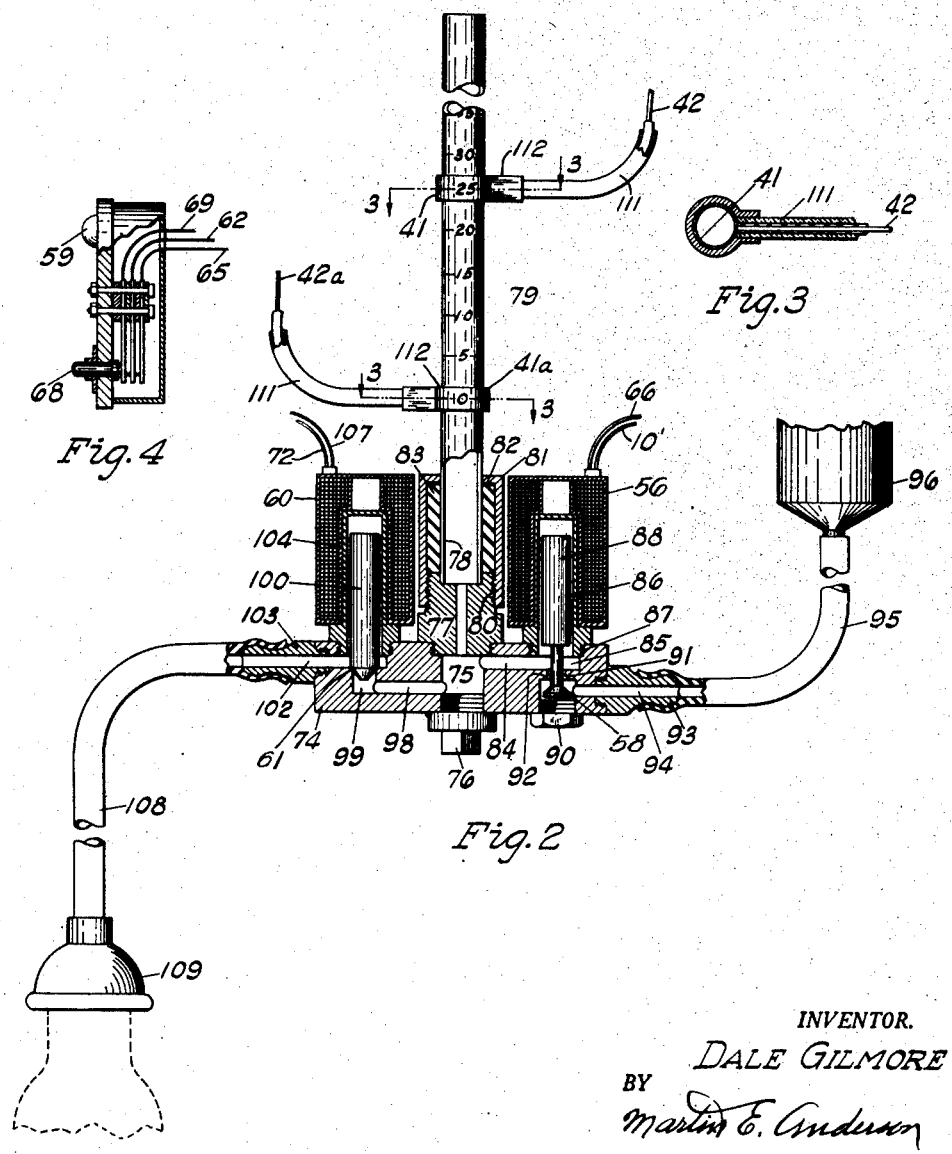

Patented Oct. 31, 1944

2,361,837

UNITED STATES PATENT OFFICE 2,361,837

AUTOMATIC LIQUID DISPENSING DEVICE

Dale Gilmore, Amarillo, Tex.

Application March 4, 1944, Serial No. 525,087

6 Claims. (Cl. 222—445)

This invention relates to improvements in automatic bottle filling machines.

Manufacturers of chemicals and other articles of commerce that are sold in bottles and more especially when sold in small bottles, find that the labor involved in the manual measuring and filling of such bottles is very great where large numbers of bottles are to be filled, and automatic bottle filling machines of various kinds have been invented.

It is the object of this invention to produce a simple and reliable mechanism for automatically filling bottles with a measured quantity of liquid and which shall employ for the purpose of measuring and operating various elements of the machine, an electronic mechanism comprising a balanced oscillating electric circuit which is associated with the machine in such a manner that it will automatically control valve operating mechanisms associated with a burette.

This invention, briefly described, comprises a device having two electrically controlled valves, one of which is interposed in a conduit connecting a burette with a supply reservoir and another valve interposed in a conduit connecting the burette with a bottle filling nipple. Secured to the burette and longitudinally adjustable thereon are two metallic bands each of which forms one plate of a condenser. These bands are positioned such a distance apart that the volume of liquid between the two condenser elements equals the quantity to be supplied to each bottle. With each condenser element is associated a balanced oscillating circuit connected with suitable electronic devices in a manner which will hereinafter be explained. One of the balanced oscillating circuits serves to close the supply valve when the liquid in the burette reaches the upper condenser or control element and to light a signal lamp. The other balanced oscillating circuit forms a means for closing the valve that connects the burette with the bottle filling nozzle when the liquid level in the burette falls to a predetermined position with respect to the lowermost control or condenser element.

Having thus briefly described the invention and its objects, the invention will now be described in detail, and for this purpose reference will now be had to the accompanying drawings in which the invention has been illustrated, and in which:

Figure 2 is a view partly in section and partly in elevation showing the measuring device and the inlet and outlet valves associated therewith;

Figure 3 is a section taken on lines 3—3, Figure 2; and

Figure 4 is a diagrammatic view of the bottling switch employed in the device.

Figure 1:
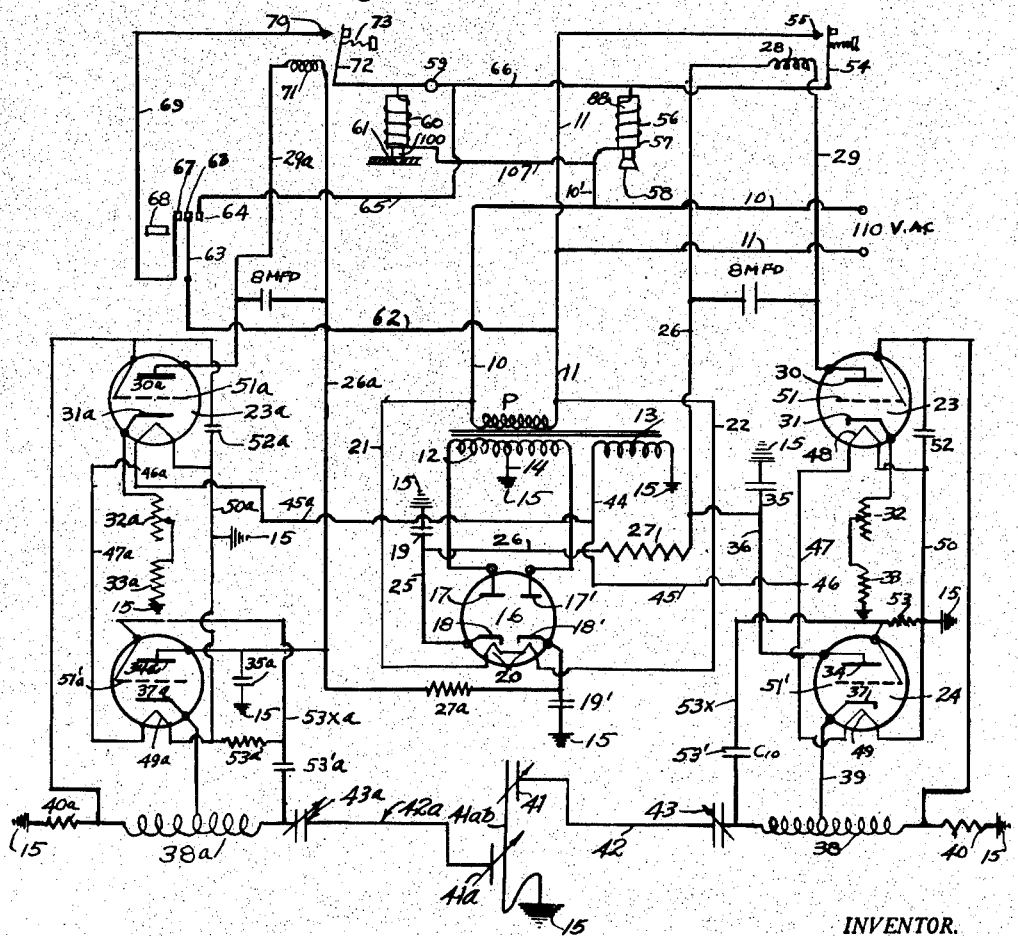
Figure 1 is a circuit showing the various electronic elements and associated parts that form the valve control mechanism.

In the drawings the supply circuit has been shown as a 110 volt alternating current circuit and comprises the wires 10 and 11. The supply or input circuit is connected to the primary P of a transformer. This transformer has been shown as provided with two secondary windings designated by reference numerals 12 and 13. The secondary winding 12 has a central tap 14 which is grounded to the chassis at 15. It may be explained here that all the grounds shown on this wiring diagram are chassis grounds and they will, therefore, be designated by the same reference numeral wherever shown. The secondary 12 bears such a relation to the primary that the secondary voltage will be 660 volts and this is divided into two equal parts by means of the center tap 14. Secondary winding 13 bears such a relation to the primary that the secondary voltage is 6.3 volts and is employed exclusively for the heater circuit. A full-wave, high vacuum rectifier doubler of the heater cathode type and which has been designated by reference numeral 16 has two plate elements 17 and 17' connected with the terminals of the secondary 12. This rectifier doubler is of the type known as 117Z6–GT. The cathodes 18 and 18' are grounded through 16 mfd. condensers 19 and 19'. The heaters have been designated by reference numeral 20 and are connected across the input circuit by means of conductors 21 and 22. It is now evident that when the circuit to the transformer is closed, a double wave rectification of the secondary current will take place with the result that the rectified current will flow to the ground through tap 14.

Associated with the rectifier 16 are two balanced oscillating circuits of identical construction, each of which is supplied with direct current from cathode 18 or 18'. The circuits connected on the two sides of the rectifier 16 are duplicates and therefore the description will be limited to the one located on the right of this rectifier. Each of the two oscillating circuits is provided with a "high-mu" power amplifier triode of the type known to the trade as 6AC5–GT which has been designated by reference numeral 23 and with a detector amplifier triode 24 of the type known to the trade as 6P5–GT. Connected with the conductor 25 that extends from the cathode 18 to the ground 15, is a conductor 26 that is connected in series with a 2500 ohm resistance 27. Conductor 26 extends to and is connected with the 5000 ohm relay winding 28. From the relay winding a conductor 29 extends to the plate 30 of the power amplifier triode 23. The cathode 31 of the amplifier 23 is connected to the ground through a potentiometer comprising an adjustable 250 ohm resistance 32 and a nonadjustable 250 ohm resistance 33. The detector amplifier triode 24 has its plate 34 ground through a .05 mfd. condenser 35 and is shown connected with one plate of the condenser by means of a conductor 36. The cathode 37 of the triode 24 is connected to the center of a coil 38 by means of a conductor 39. One end of this coil is grounded through a 25000 ohm resistance 40. The other end of coil 38 is connected with the upper condenser plate 41 on the burette by means of a conductor 42 in which is connected an adjustable trimmer condenser 43.

Extending from the ungrounded terminal 44 of the secondary 13 is a conductor 45 that is connected at 46 with a conductor 47 that connects with the heater elements 48 and 49. The other terminals of these heater elements are connected by means of a conductor 50 that is grounded to the chassis at 15. Control grid 51 is connected with conductor 50 through a .05 mfd. condenser 52 and the control grid 51' is connected with conductor 50 and with the ground through a 1 megohm resistance 53. Control grid 51' is connected with the coil 38 between it and condenser 43 by means of conductor 53x. The potentiometer 32 and the trimmer condenser 43 are adjusted so as to balance the circuit comprising the coil 38, so that no current will normally flow through the triode 24. When the control condenser 41 is changed by the rising of the liquid in the burette, this circuit will become unbalanced, whereupon the control grids 51 and 51' will be altered in potential thereupon permitting a current to flow from the cathode 31 to the plate 30 in the power amplifier triode 23 and thus current will flow through the relay coil 28 and continue to cathode 18 of rectifier 16. When current is thus caused to flow, the relay attracts armature 54, closing the circuit at 55 thereby completing the circuit through the coil 56 of the electro-magnetically controlled valve 57, whereupon the armature to which the conical valve 58 is attached will rise and stop the flow of liquid from the supply reservoir 96, to the burette. It will be observed from Figure 1 that a glow lamp 59 of a very small wattage, is connected in series with the winding 60 of the electro-magnetically controlled valve 61. The current that flows through the glow lamp and through coil 60 is too small to operate the valve which therefore remains closed. A conductor 62 connects the supply circuit conductor 11 with the center contact 63 of a bottling switch. This switch has a contact 64 connected by means of a conductor 65 with conductor 66 at a point between the glow lamp and the armature 54. The bottling switch is also provided with a third contact which has been designated by reference numeral 67 and with a push button 68. Contact 67 is connected by means of a conductor 69 to the relay contact 70 of the relay whose coil has been designated by reference numeral 71. The armature 72 is biased to open position by means of a spring 73 and is moved to circuit closing position whenever coil 71 is energized.

At this point reference will be had to Figure 2 in which reference numeral 74 designates the body of a valve assembly. This body is provided with a center opening 75 whose lower end is closed by means of a plug 76. A tubular plug 77 is threadedly connected in the upper end of opening 75 and has a circular recess 78 in which the lower end of the burette 79 is positioned. The tubular member 77 has its outer surface provided with threads 80 which cooperate with the threads on the inner lower surface of the cylindrical member 81 whose upper end is provided with an inturned flange 82. A rubber gasket 83 is positioned between the upper end of member 77 and the flange 88 and when member 81 is turned in a direction to move flange 82 downwardly, it compresses the rubber ring 83 and forms a tight seal with the outer surface of the burette. Extending to the right from opening 75 is a smaller opening which has been designated by reference numeral 84, and this communicates with a valve chamber 85. A tubular member 86 of nonmagnetic material is threadedly connected at 87 with the wall of the valve chamber. Positioned within member 86 is an armature 88 to the lower end of which the valve member 58 is secured. It will be observed that the valve chamber has its lower end closed by means of a plug 90 and that it is separated into two parts by the inturned flange 91. The lower surface of this flange is bevelled to provide a valve seat with which the inclined valve surface 92 engages when the armature 88 is raised. Secured to the member 74 is a nipple 93 whose opening 94 is in communication with the valve chamber 85 below the flange 91. A flexible rubber tube 95 is connected with nipple 93 and extends to the supply reservoir 96. A removable solenoid 56 is positioned about the tubular member 86 and the ends of this helix terminate in conductors 66 and 10'. Whenever solenoid 56 is energized the armature core 88 will be raised so as to close the valve 58 that controls the flow of liquid from the supply reservoir to opening 75.

On the lefthand side of opening 75 a small opening 98 extends to the valve chamber 99. An armature core 100 is normally resting on the valve seat 101 and closes communication between opening 98 and opening 102. A nipple 103 is threadedly connected with the body 74 with its opening in communication with opening 102. A tubular member 104 extends upwardly from the valve chamber 99 and encloses the armature core 100. Surrounding member 104 is a solenoid 60 whose terminals have been designated by reference numerals 72 and 107. A tube 108 extends from the nipple 103 to the bottling bell or nozzle 109. When the solenoid 60 is energized it will raise the armature core 100 from its seat and permit liquid to flow from the burette to the bottling bell, but when this solenoid is deenergized, the valve 61 will close.

Referring now to Figure 3, reference numeral 41 designates a metal band of circular shape and of such size that it will fit the outside of the burette 79 with a sliding fit, which forms one element of a condenser whose other element is formed by the liquid in the burette which has been represented by 41ab in Figure 1. Conductor 42, which is positioned within a lead shield 111, is in electrical engagement with the metal ring or condenser element 41. Ring 41 is enclosed in a fiber housing 112. The ring 41 forms an element of the control condenser shown in Figure 1 and has been indicated as positioned on the 25 centimeter graduation of the burette. A similar condenser or control element is positioned on the zero graduation and this has been designated by reference numeral 41a in Figure 1. When the liquid rises in the burette, it changes the capacity of the condenser formed by the encircling condenser element 41 and the liquid 41ab. The trimmer condenser 43a and the potentiometer 32a are so adjusted that when the liquid is at the zero graduation, relay armature 72 will be attracted so as to close the circuit and this will remain closed until the liquid falls a predetermined distance. As the liquid rises in the burette and approaches the graduation 25, it changes the capacity of the control condenser, thereby upsetting the balanced circuit and producing a flow of current through the relay coil 28 so as to close the circuit between the armature 54 and the contact 55. When this circuit is closed the inlet valve 58 is moved to closed position. When the relay contacts 54 and 55 come into engagement, the glow lamp 59 is lighted, thereby indicating that the device is ready for filling a bottle and upon seeing this signal the operator applies the bell 109 to the bottle and presses button 68, whereupon the armature core 100 is raised, opening a passage from the burette to the bottling bell 109. When the level of the liquid in the burette falls below the point for which the lower control or condenser element is adjusted, it upsets the balance of the oscillating circuit to the left and opens the circuit between armature 72 and contacts 70 whereupon the solenoid core 100 drops in response to the action of gravity and closes the discharge valve 61 whereupon the lamp 59 will again glow. The operator now removes the pressure from push button 68 which opens the circuit through coil 56 and permits valve 58 to open; this also extinguishes the lamp 59. The glow lamp is of such small wattage (4 watts) that although it is in series with coil 60, valve 61 will not operate in response thereto.

Valve 58 is now open and permits the burette to be filled to the upper control limit; relay armature 54 will now be attracted and close valve 58 and cause the signal lamp 59 to glow, indicating to the operator that the measured quantity of chemical is ready to be dispensed, whereupon he applies the bottling bell to the bottle and presses the push button 68, thereby opening the discharge valve, which remains open until the lower limit is reached and this cycle is repeated automatically. The operator merely controls the time at which the discharge valve opens so as to be able to prevent any of the chemicals or liquid from being lost or from being discharged before the bottling bell is applied to the bottle.

The device operates as follows: Reservoir 96 is positioned at a higher elevation than the burette and whenever valve 58 is open liquid will flow from the reservoir to the burette. When the level of the liquid reaches the upper control element, the circuit of which this control element forms a part will become unbalanced whereupon relay 28 will be energized thereby closing the circuit at 55. Valve 58 will now close and lamp 59 will glow indicating that the device is ready to discharge the liquid. The operator, after having positioned a bottle in the bottling bell, closes the bottling switch, thereby opening the discharge valve 61, whereupon the liquid will flow from the burette into the bottle. When the bottling switch is closed, the lamp will stop glowing. When the level falls to a predetermined point below the lower control element 41a the oscillating circuit of which it forms an element will be changed and relay 71 will open the circuit at 70, thereby allowing valve 61 to close. When relay 71 is opened the lamp will glow indicating that the operation has been completed, whereupon the operator releases the bottling switch and a new cycle commences.

As above stated, there are two independent control circuits, each responsive to the change in capacity which occurs as the liquid 41ab approaches and recedes from the condenser elements 41 and 41a. The corresponding elements in the two circuits have been given similar reference characters, those applied to the left-hand circuit having "a" added thereto.

For the purpose of illustration, the invention has been described in connection with a bottle filling device. It is to be understood that it can be used for specifically different purposes. The burette 79 may be a gauge glass on a tank or boiler, for example, or the tank may be a gasoline reservoir and the device used for dispensing gasoline in measured quantities. By means of a plurality of upper controls and a system of switches, an operator can, by selecting any one of the controls, measure and dispense any of a number of quantities of liquid. Since gauge glasses connected with tanks or reservoirs, are well known and since the use of several upper control members either of which can be selected by a switch mechanism is the equivalent of a single control element, that is moved from one position to another the modification referred to has not been shown on the drawings.

Having described the invention what is claimed as new is:

1. A device for dispensing liquids in measured quantities comprising in combination, a supply reservoir, a discharge nozzle, a measuring device positioned between the reservoir and the discharge nozzle, comprising, an upwardly ranging tubular measure, conduits communicating the interior of the measure with the reservoir and with the discharge nozzle, a normally open valve in the conduit from the reservoir, a normally closed valve in the conduit to the discharge nozzle, electro-magnetic means, for closing the normally open valve when the liquid level reaches a predetermined height in the measure, means comprising a manually operable switch for opening the normally closed valve, means responsive to the liquid level for closing the normally closed valve when the liquid level has fallen to a predetermined height, and means comprising the manually operable switch for opening the normally open valve to initiate another cycle.

2. A device for dispensing liquids in measured quantities comprising, in combination, a supply reservoir, a discharge nozzle, a measuring device positioned between the reservoir and the discharge nozzle, comprising, an upwardly ranging tubular measure, conduits communicating the interior of the measure with the reservoir and with the discharge nozzle, a normally open valve in the conduit from the reservoir, a normally closed valve in the conduit to the discharge nozzle, electro-magnetic means comprising a normally open relay and an electromagnet controlled thereby, for closing the normally open valve when the liquid level reaches a predetermined height in the measure, means comprising a manually operable switch for opening the normally closed valve, means responsive to the liquid level comprising a normally open relay and an electromagnet controlled thereby for closing the normally closed valve when the liquid level has fallen to a predetermined height, and means comprising the manually operable switch for opening the normally open valve to initiate another cycle.

3. A device for dispensing liquids in measured quantities comprising in combination a supply reservoir, a discharge nozzle, a measuring device positioned between the reservoir and the discharge nozzle, comprising, an upwardly ranging tubular measure, conduits communicating the interior of the measure with the reservoir and with the discharge nozzle, a normally open valve in the conduit from the reservoir, a normally closed valve in the conduit to the discharge nozzle, electromagnetic means comprising a normally open relay circuit having a control element responsive to the level of the liquid in the measure and an electromagnet controlled thereby, for closing the normally open valve when the liquid reaches a predetermined maximum height in the measure, a signal lamp, means controlled by the relay for lighting the lamp when relay closes, means comprising a manually operable switch for opening the normally closed valve, and means responsive to the liquid level in the measure and comprising a relay and an electromagnet for closing the normally closed valve when the liquid level in the measure falls below a predetermined height and for lighting the lamp, and means comprising the manually controlled switch for opening the normally open valve and extinguishing the lamp thereby putting the device in condition to begin a new cycle.

4. A device for dispensing liquids in measured quantities comprising, in combination, a reservoir, a dispensing nozzle, a vertical tubular measure, a conduit connecting the reservoir with the interior of the tubular measure, another conduit connecting the measure with the dispensing nozzle, a normally open valve in the first mentioned conduit, a normally closed valve in the second conduit, a condenser element positioned about the outside of the tubular measure at the lower limit of the liquid level, another condenser element positioned about the tubular measure at the upper limit of the liquid level, a balanced oscillating circuit of which the first mentioned condenser forms a part, a second oscillating circuit of which the second condenser element forms a part, a normally open relay associated with each oscillating circuit an electromagnet associated with each valve, means comprising the upper condenser element and the relay for closing the normally open valve when the liquid reaches the upper limit in the measure, means comprising a switch for opening the normally closed valve when the normally open valve has closed, means for closing the normally closed valve when the liquid level has fallen to a predetermined position relative to the lower condenser element, and means comprising the switch for opening the normally open valve.

5. A device for dispensing liquids in measured quantities comprising, in combination, a reservoir, a dispensing nozzle, an elongated upwardly ranging tubular measure, a base having a recess for the reception of the lower end of the measure, the base having an inlet and an outlet passage connecting the interior of the measure with the reservoir and with the dispensing nozzle, respectively, means comprising a normally open electrically operated valve for controlling the flow of liquid from the reservoir to the measure, a condenser element positioned around the measure at the point of highest liquid level, a balanced oscillating electronic circuit of which the condenser forms a part, a relay in said circuit, means comprising the balanced circuit and the condenser element for energizing and closing the relay when the circuit is unbalanced due to the approach of the liquid to the condenser element, whereby the normally open valve will be moved to closed position, a signal lamp, means for lighting the lamp when the relay closes, to indicate that the liquid has reached the desired level in the measure, a normally closed electrically operated valve in the outlet passage, means comprising a manually operable switch for moving the normally closed valve to open position whereby the liquid in the measure will flow to the dispensing nozzle and for simultaneously rendering the signal lamp inoperative, a second condenser element positioned around the tubular measure at the lower liquid level, a balanced oscillating electric circuit of which the last mentioned condenser element forms a part, means comprising a manually operable switch for opening the normally closed valve, and means responsive to changes in the last mentioned balanced circuit and comprising the normally closed relay for returning the second mentioned valve to closed position, the manually controlled switch functioning as a means to move the normally open valve to open position and for relighting the lamp.

6. A device in accordance with claim 4 in which there is a signal lamp, means comprising the first mentioned relay to light the lamp when the relay closes, and means comprising the manually controlled switch for deenergizing the lamp when the normally closed valve is opened.

DALE GILMORE.